United States Patent
Koo et al.

(10) Patent No.: US 9,629,191 B2
(45) Date of Patent: Apr. 18, 2017

(54) SYSTEMS AND METHODS FOR INITIATING DEVICE-TO-DEVICE COMMUNICATION IN WIRELESS NETWORKS

(71) Applicant: BlackBerry Limited, Waterloo (CA)

(72) Inventors: Changhoi Koo, Plano, TX (US); Joon Beom Kim, Carrollton, TX (US); Zhijun Cai, Irving, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 383 days.

(21) Appl. No.: 14/078,404

(22) Filed: Nov. 12, 2013

(65) Prior Publication Data
US 2015/0131540 A1    May 14, 2015

(51) Int. Cl.
*H04W 76/02* (2009.01)
*H04W 72/08* (2009.01)
*H04W 76/04* (2009.01)
*H04W 4/00* (2009.01)

(52) U.S. Cl.
CPC ......... *H04W 76/023* (2013.01); *H04W 72/08* (2013.01); *H04W 76/043* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 2007/0115884 A1* | 5/2007 | Shang et al. | 370/331 |
| 2007/0129076 A1* | 6/2007 | Cho | H04W 76/023 455/436 |
| 2011/0134827 A1* | 6/2011 | Hooli et al. | 370/315 |
| 2011/0258313 A1* | 10/2011 | Mallik et al. | 709/224 |
| 2013/0034082 A1* | 2/2013 | Etemad et al. | 370/331 |
| 2014/0029471 A1* | 1/2014 | Tavildar et al. | 370/255 |
| 2014/0071950 A1* | 3/2014 | Jang et al. | 370/331 |
| 2014/0127991 A1* | 5/2014 | Lim | H04W 76/023 455/39 |
| 2014/0185587 A1* | 7/2014 | Jang et al. | 370/331 |
| 2014/0226504 A1* | 8/2014 | Tavildar et al. | 370/252 |
| 2014/0376458 A1* | 12/2014 | Ryu et al. | 370/329 |
| 2015/0237555 A1* | 8/2015 | Kashiwase | H04W 36/30 370/329 |

OTHER PUBLICATIONS

Wi-Fi Alliance Technical Committee P2P Task Group, Wi-Fi Peer-to-Peer (P2P) Technical Specification, Version 1.1, 2010 (159 pages).

(Continued)

*Primary Examiner* — Hassan Phillips
*Assistant Examiner* — Saba Tsegaye
(74) *Attorney, Agent, or Firm* — Fish & Richardson P.C.

(57) ABSTRACT

Systems, methods, and apparatuses for initiating device-to-device (D2D) communication in wireless communication networks are provided. Based on received downlink or uplink signal qualities, a two-stage process, that is, a first stage of information request and a second stage of actual information transfer, may be used to initiate the D2D communication. Multiple thresholds, timers, and/or counters may be used in connection with the two-stage process. The two-stage process reduces unnecessary signaling overhead for initiating the D2D communication.

24 Claims, 6 Drawing Sheets

(56) References Cited

OTHER PUBLICATIONS

The Wi-Fi Alliance Submission of Contribution, "Wi-Fi Peer-to-Peer (P2P) Technical Specification—Wi-Fi Direct Service Addendum Contribution", Nov. 19, 2012 (20 pages).
The Wi-Fi Alliance Submission of Contribution, "Wi-Fi Direct Services Technical Specifications Proposal", Nov. 19, 2012 (65 pages).
IEEE Standard for Information Technology, 802.15.4, Part 15.4: Wireless Medium Access Control (MAC) and Physical Layer (PHY) Specifications for Low-Rate Wireless Personal Area Networks (LR-WPANs), IEEE Computer Society, Oct. 1, 2003 (679 pages).
3GPP TSG RAN Meeting #58, RP-122009 "Study on LTE Device to Device Proximity Services", Qualcomm Incorporated, Dec. 2012 (6 pages).
3GPP TR 22.803, V0.2.0, Technical Specification Group SA; Feasibility Study for Proximity Services (ProSe), Release 12, Feb. 2012 (17 pages).
3GPP TS 36.211, V10.7.0, Technical Specification Group Radio Access Network; Evolved Universal Terrestrial Radio Access (E-UTRA); Physical Channels and Modulation, Release 10, Feb. 2013 (101 pages).
3GPP TS 36.213, V10.10.0, Technical Specification Group Radio Access Network; Evolved Universal Terrestrial Radio Access (E-UTRA); Physical layer procedures, Release 10, Jun. 2013 (127 pages).
3GPP TS 22.278, V12.2.0, Technical Specification Group Services and System Aspects; Service requirements for the Evolved Packet System (EPS), Release 12, Mar. 2013 (42 pages).

\* cited by examiner

SYSTEMS AND METHODS FOR INITIATING DEVICE-TO-DEVICE COMMUNICATION IN WIRELESS NETWORKS

TECHNICAL FIELD

The present disclosure generally relates to communications in wireless communication networks, and more particularly, to initiating device-to-device communication in wireless networks.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network and the EPC network may forward the data packet to another base station or to the same base station that is serving another UE. Data transfer between the UEs is routed through the base station and the EPC.

When two UEs in a wireless network are located in proximity and wish to exchange information between each other, it may be efficient to establish a communication link directly between the UEs, instead of transferring data via the network. Currently the UEs may communicate directly with each other using other radio access technology (RAT), such as, wireless local area network (WLAN) or Bluetooth when the UEs have access to the other RAT. However, this requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

The present disclosure relates to systems, methods, and apparatuses for device-to-device communication in wireless communication networks. In cellular communication systems, data transfer between UEs is routed through a base station and a core network. When UEs located in close proximity communicate with each other, it would be advantageous for the UEs to communicate via a direct device-to-device (D2D) communication link between them, instead of transferring the data via a network. To do so, however, the UEs need to have the knowledge that they are in the proximity of one another. Therefore, before D2D communication can be established among these wireless devices, a procedure to obtain information of neighboring UEs should be initiated.

In the scenario that a UE is moving out of network coverage, the UE would need to be prepared for device-to-device communication in out-of-network coverage environment. Certain information, such as a UE's physical layer information and identity, may need to be transferred to other UEs for initiating D2D communication. The UE initiates the D2D communication promptly before moving out the network such that the D2D communication will be available once the UE moves out of network coverage. On the other hand, reduced signaling overheads are desired for such initiation of D2D communication for the purpose of efficiently utilizing the radio resources.

Based on received downlink or uplink signal qualities, a two-stage process, that is, a first stage of information request and a second stage of actual information transfer, may be used to initiate the D2D communication. Multiple thresholds, timers, and/or counters may be used in connection with the two-stage process. By introducing multiple thresholds, timers, and/or counters, the two-stage process, among other things, reduces unnecessary signaling overhead for initiating the D2D communication.

Reference will now be made in detail to the example embodiments implemented according to the disclosure; the examples are illustrated in the accompanying drawings. Wherever possible, the same reference numbers will be used throughout the drawings to refer to the same or like parts.

Figure 1:
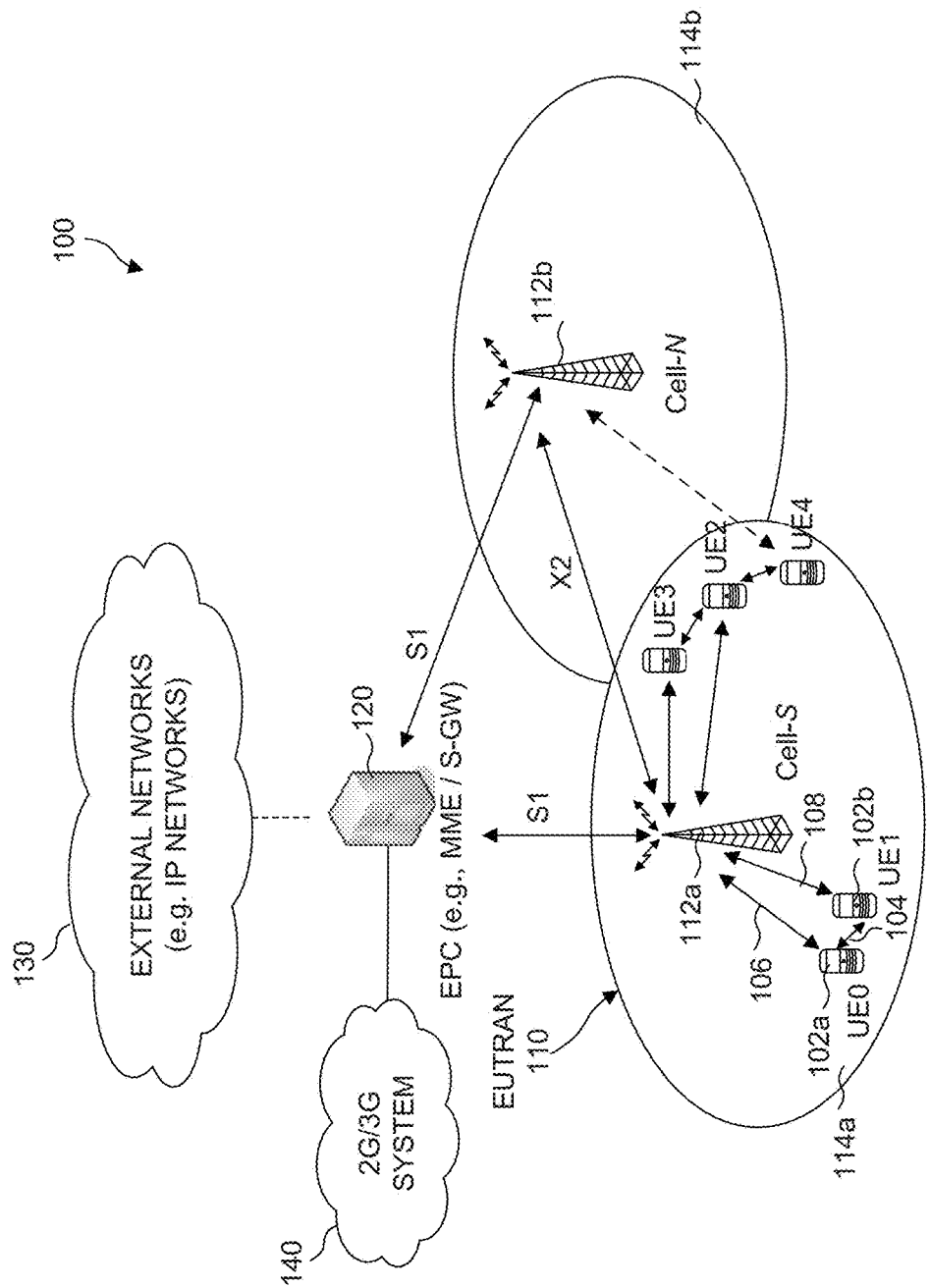
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including for example, macro cell, femto cell, relay cell, and pico cell. Base stations are nodes that can relay signals for mobile devices, also referred to herein a user equipment, or other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112*b*. User equipment (UEs) 102*a* and 102*b* operate in Cell 114*a* and are served by eNB 112*a*. The EUTRAN 110 can include one or more eNBs (e.g., eNB 112*a* and eNB 112*b*) and one or more UEs (e.g., UE 102*a* and UE 102*b*) can operate in a cell. The eNBs 112*a* and 112*b* communicate directly to the UEs 102*a* and 102*b*. In some implementations, the eNB 112*a* or 112*b* may be in a one-to-many relationship with the UEs 102*a* and 102*b*, e.g., eNB 112*a* in the example LTE system 100 can serve multiple UEs (i.e., UE 102*a* and UE 102*b*) within its coverage area cell 114*a*, but each of UE 102*a* and UE 102*b* may be connected to one serving eNB 112*a* at a time. In some implementations, the eNBs 112*a* and 112*b* may be in a many-to-many relationship with the UEs, e.g., UE 102*a* and UE 102*b* can be connected to eNB 112*a* and eNB 112*b*. The eNB 112*a* may be connected to eNB 112*b* such that handover may be conducted if one or both of the UEs 102*a* and 102*b* travels, e.g. from cell 114*a* to cell 114*b*. The UEs 102*a* and 102*b* may be any wireless electronic device used by an end-user to communicate, for example, within the LTE system 100.

The UEs 102*a* and 102*b* may transmit voice, video, multimedia, text, web content and/or any other user/client-specific content. The transmission of some content, e.g., video and web content, may require high channel throughput to satisfy the end-user demand. In some instances, however, the channel between UEs 102*a*, 102*b* and eNBs 112*a*, 112*b* may be contaminated by multipath fading due to the multiple signal paths arising from many reflections in the wireless environment. Accordingly, the UEs' transmission adapts to the wireless environment. In short, the UEs 102*a* and 102*b* may generate requests, send responses or otherwise communicate in different means with Evolved Packet Core (EPC) 120 and/or Internet Protocol (IP) networks 130 through one or more eNBs 112*a* and 112*b*.

In some implementations consistent with the present disclosure, the UEs 102*a* and 102*b* may communicate over a D2D communication link when they are located in close proximity to one another, without routing the data through the eNB 112*a*. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102*a* and 102*b* may communicate directly over the inter-device communication link 104, instead of communicating with each other through their links with the eNB 112*a*, i.e., 106 and 108 respectively. The UEs 102*a* and 102*b* may simultaneously maintain an active communication link with the eNB 112*a* such that the UEs 102*a* and 102*b* may still receive messages from the eNB or other UEs, when communicating with each other over the direct D2D communication link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102*a* or 102*b* may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102*a* or 102*b* may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102*a*, 102*b* and EPC 120. The EUTRAN 110 includes at least one eNB 112*a* or 112*b*. The eNB can be a radio base station that may control all, or at least some, radio related functions in a fixed part of the system. One or more of eNB 112*a* or 112*b* can provide radio interface within their coverage area or a cell for the UEs 102*a*, 102*b* to communicate. The eNBs 112*a* and 112*b* may be distributed throughout the cellular network to provide a wide area of coverage. The eNBs 112*a* and 112*b* may directly communicate with one or more UEs 102*a*, 102*b*, other eNBs, and the EPC 120.

The eNBs 112*a* and 112*b* may be the end point of the radio protocols towards the UEs 102*a*, 102*b* and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UEs 102*a*, 102*b*, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

The present disclosure is not limited to the environment shown in FIG. 1. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 Wireless Local Area Network (WLAN), IEEE 802.16 WiMAX network, etc.

Figure 2:
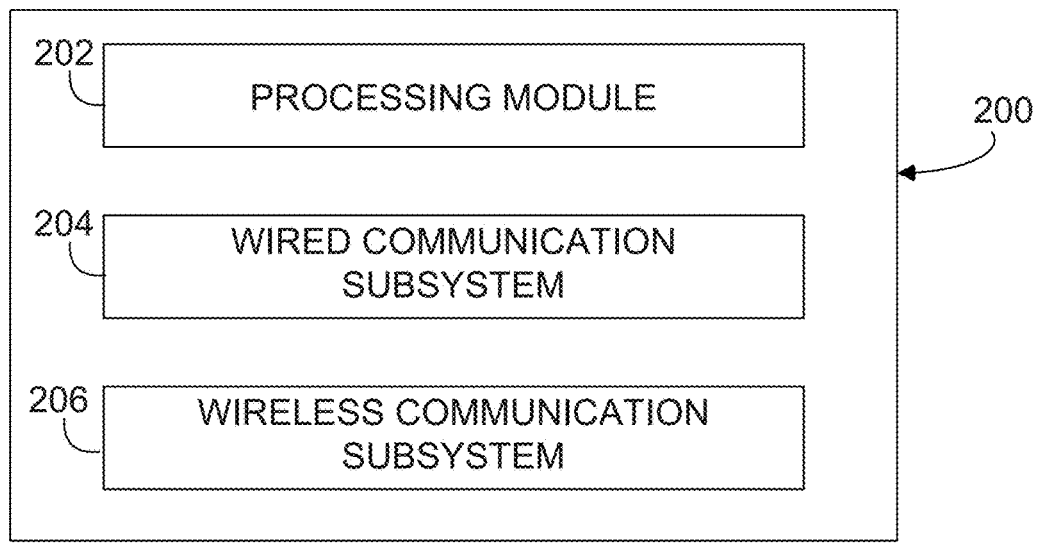
FIG. 2 illustrates an example access node device, in accordance with an embodiment of the present disclosure.

FIG. 2 illustrates components of an example access node device 200 consistent with certain aspects of this disclosure. The example access node device 200 includes a processing module 202, a wired communication subsystem 204, and a wireless communication subsystem 206. The processing module 202 includes one or more processing components (alternatively referred to as "processors" or "central processing units" (CPUs)) operable to execute instructions related to one or more of the processes, steps, or actions described in connection with one or more of the embodiments disclosed herein. The processing module 202 also includes other auxiliary components, such as random access memory (RAM), read only memory (ROM), secondary storage (for example, a hard disk drive or flash memory). Additionally, the processing module 202 executes certain instructions and commands to provide wireless or wired communication, using the wired communication subsystem 204 or a wireless communication subsystem 206. Various other components can also be included in the example access node device 200.

Figure 3:
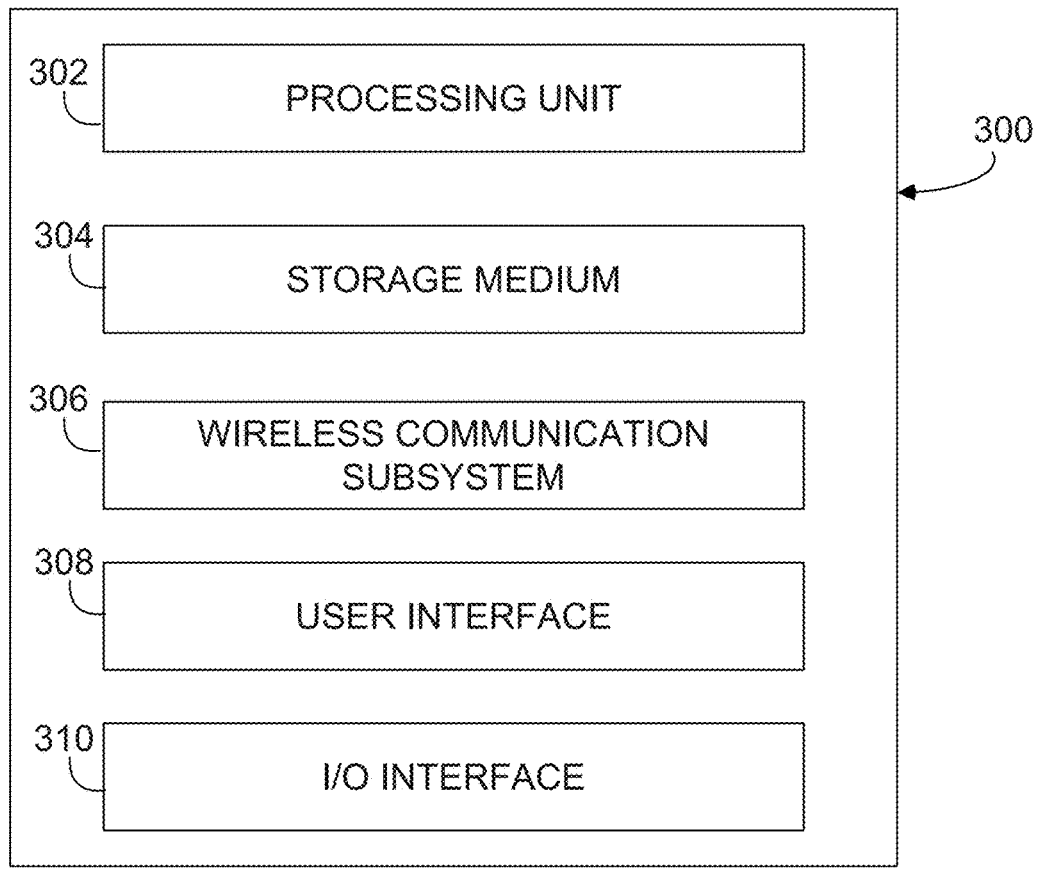
FIG. 3 illustrates an example user equipment device, in accordance with an embodiment of the present disclosure.

FIG. 3 illustrates components of an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 includes components and performs functions similar to the processing module 302 described with regard to FIG. 2. The wireless communication subsystem 306 is configured to provide wireless communications for data information or control information provided by the processing unit 302. The wireless communication subsystem 306 includes, for example, one or more antennas, a receiver, a transmitter, a local oscillator, a mixer, and a digital signal processing (DSP) unit. In some implementations, the wireless communication subsystem 306 can support MIMO transmissions.

The user interface 308 includes, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 includes, for example, a universal serial bus (USB) interface. Various other components can also be included in the example UE device 300.

Figure 4:
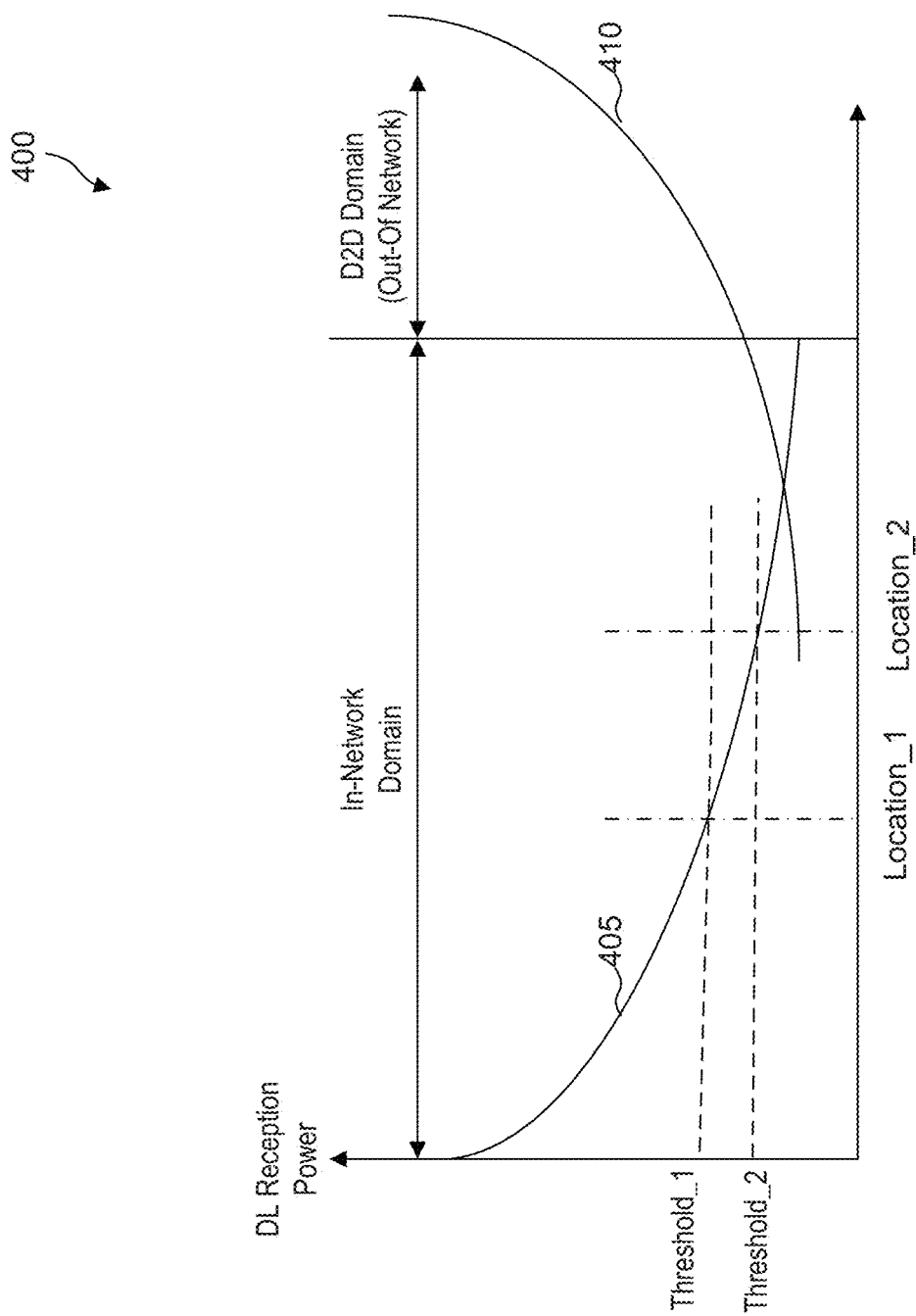
FIG. 4 illustrates an example graph used to explain a scenario for initiating device-to-device communication, in accordance with an embodiment of the present disclosure.

FIG. 4 illustrates an example graph 400 used to explain a scenario for initiating device-to-device communication, in accordance with an embodiment of the present disclosure. The horizontal axis of graph 400 represents geographical location of the UE, and the vertical axis of graph 400 represents the downlink signal reception power at the UE. As the UE moves out of in-network domain and moves into the D2D domain, the downlink (DL) signal reception quality from its serving base station 405 decreases, whereas the DL signal reception quality from the neighboring UEs 410 increases. The D2D domain refers to out-of-network area where wireless network service is not available but one or more neighboring UEs are located in close proximity with the UE in the out-of-network area for D2D communication. Before the UE moves into the D2D domain and loses its connection with the network, the UE needs to prepare for D2D communication with the assistance of the network. For example, the network may provide information of neighboring UEs to the UE such that the UE may establish D2D communication with other UEs once network service is no longer available. Such information may include the neighboring UEs' identities, location, radio capabilities, mobility information, etc. The network may also provide the UE's information to its neighboring UEs for the potential D2D communication. For example, the network may send information of the UE's identity, location, radio capability to the neighboring UEs which may initiate the D2D communication with the UE subsequently.

A two-stage process may be used to initiate the D2D communication, that is, a first stage of information request and a second stage of actual information transfer. For example, when the UE moves to Location_1 and DL signal reception quality from the serving base station 405 falls below or equal to a first threshold, Threshold_1, the UE may initiate a first stage of D2D communication initiation with the network. In some implementations, the UE may initiate the first stage of D2D communication when the UE detects a D2D service is available or the UE moves to a pre-defined area that a D2D service is configured. During this first stage, the UE may send a D2D information request message to the network requesting for information of neighboring UEs, or send D2D service information to the network. The network may then collect information of the neighboring UEs and send the neighboring UEs information to the UE. As the UE continues to move away from the network to Location_2 and the DL signal reception quality from the serving base station 405 falls below or equal to a second threshold, Threshold_2, the UE may initiate a second stage of D2D communication initiation with the network. During this second stage, the UE may send a D2D information message to the network, including its D2D related information, such as location, residual power, supportable quality of service (QoS) level, interested D2D service information, etc. When the network receives the D2D information message from the UE, the network may update the neighboring UEs with the received D2D information from the UE. Eventually as the UE moves out of the network and enters into the D2D domain, the UE is disconnected from the network but the UE may establish D2D communication with other UEs using the provided information from the network.

By having a two-stage process for initiating the D2D communication, the second stage of information transfer occurs when the UE continues to move away from the network after the first stage. If the UE moves back to the network and the received DL signal quality rises above both the first threshold and the second threshold, the second stage of information transfer will not occur, and thus, unnecessary signaling overhead for the information transfer is avoided.

Figure 5:
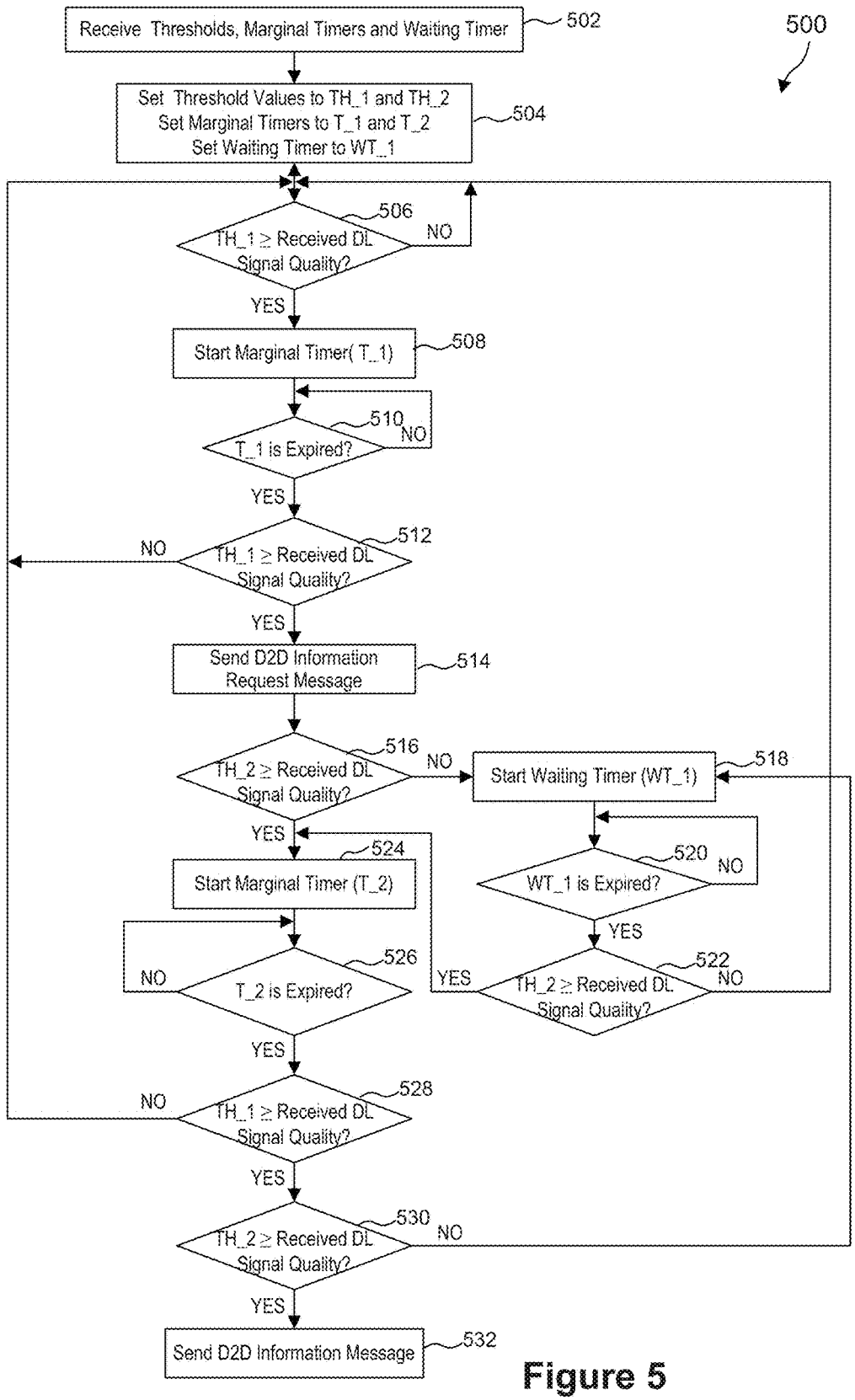
FIG. 5 illustrates a block diagram of an example method for initiating device-to-device communication in a wireless network, in accordance with an embodiment of the present disclosure.

FIG. 5 illustrates a process diagram 500 of an example set of operations or method for initiating device-to-device communication in a wireless network, in accordance with an embodiment of the present disclosure. In this example method, the UE measures its received DL signal quality from the base station, and initiates the D2D communication based on the received DL signal quality. The received DL signal quality may be based on UE's measurement of downlink Reference Signal Received Power (RSRP), Reference signal received quality (RSRQ), Signal to Interference Noise Ratio (SINR), etc. In some implementations, the received DL signal quality may also be the metrics related with the control channel quality measurement, such as the Physical Downlink Control Channel (PDCCH) or Enhanced Physical Downlink Control Channel (EPDCCH) reception quality. The received DL signal quality may also be the metrics related with the synchronization channel quality.

At 502, the UE receives values of the thresholds, marginal timers, and waiting timer from the base station. The thresholds and timers are used in the two-stage process to determine whether to send a request to the network for initiation of D2D communication. In some implementations, the values of the thresholds, marginal timers, and waiting timer may also be determined by the UE itself. In this example method, two thresholds are defined. In some implementations, more than two threshold values may be used. The first threshold is used when the UE is a candidate for D2D communication, while the second threshold is used to indicate to the network that the UE will form a D2D link.

At 504, the UE sets the two threshold values to be TH_1 and TH_2 respectively. The UE also sets the values of the two marginal timers to be T_1 and T_2, and sets the value of the waiting timer to be WT_1. At 506, the UE determines whether the received DL signal quality is below or equal to the first threshold TH_1. The first threshold TH_1 may be defined in dB unit. The first threshold TH_1 may also be defined by the number of subframes failed to be decoded at the UE. The first threshold TH_1 may be allocated by the network using the downlink Radio Resource Control (RRC) message or System Information Block (SIB) message or MAC control elements. In some implementations, the first threshold TH_1 may be defined as a pre-determined parameter or be defined by operator's requirement.

If the received DL signal quality is above the first threshold TH_1, the UE will not initiate the D2D communication. On the other hand, if the received DL signal quality is below or equal to the first threshold TH_1, the UE starts the marginal timer T_1 at 508. In this example method, the UE sets the marginal timer to verify whether the DL reception quality continues to be below or equal to TH_1 for sending the D2D information request message to the network. The value of the marginal timer T_1 may be defined as elapsed time in seconds, subframes, radio frames, or other time units. The value of the marginal timer T_1 may be allocated by the network using DL RRC message, medium access control (MAC) control element (CE), or SIB message. In some implementations, the marginal timer T_1 may be defined as a pre-determined parameter or defined by operator's requirement.

While the marginal timer T_1 is running, the UE may continually measure DL reception quality to make a decision after expiring of timer T_1. In this case, the UE may use accumulated DL reception quality for the determination of received DL signal quality. Alternatively, the UE may not measure DL reception quality while the timer T_1 is running. In this case, the UE may measure DL reception quality once expiring of timer T_1.

At 510, the UE checks whether the marginal timer T_1 is expired. If the marginal timer T_1 is not yet expired, the UE may wait a certain time period and then check again. If the marginal timer T_1 is expired at 510, the UE will proceed to 512 to determine whether the current received DL signal quality is still below or equal to the first threshold TH_1. If at this time, the current received DL signal quality becomes better and is greater than the first threshold, the UE will refrain from sending any message to the network to initiate the D2D communication. Instead, the UE will stop the marginal timer T_1, reset it to zero, and return to step 506 of this example method. In other words, the triggering condition for initiating D2D communication is cleared. On the other hand, if the current received DL signal quality is still below or equal to the first threshold TH_1, the UE then proceeds to send a D2D information request message to the base station at 514. The information request message indicates to the network that the UE may initiate D2D communication. The D2D information message also requests the network to send the UE information of its neighboring UEs. In some implementations, the D2D information message may further request the network to send the UE information of available D2D services in the area. After receiving the message from the UE, the base station may then send D2D related information of neighboring UEs and other requested information which have potential to form D2D communication links to the UE. The D2D related information of neighboring UEs may include location, identifications, and supportable QoS levels of these UEs.

At 516, the UE determines whether the current received DL signal quality from its serving base station is below or equal to a second threshold, TH_2. The second threshold TH_2 may be defined in dB unit. The second threshold TH_2 may also be defined by the number of subframes failed to be decoded at the UE. The second threshold TH_2 may be allocated by the network using the downlink RRC message or SIB message. In some implementations, the second threshold TH_2 may be defined as a pre-determined parameter or be defined by operator's requirement.

If the current received DL signal quality is above the second threshold TH_2, the UE starts a waiting timer WT_1 at 518. The value of the waiting timer WT_1 may be defined as elapsed time in seconds, subframes, radio frames, or other time units. The value of the waiting timer WT_1 may be allocated by the network using DL RRC message, MAC control element (CE), or SIB message. In some implementations, the waiting timer WT_1 may be defined as a pre-determined parameter or defined by operator's requirement.

While the waiting timer WT_1 is running, the UE may continually measure DL reception quality to make a decision after expiring of the waiting timer WT_1. In this case, the UE may use accumulated DL reception quality for the determination of received DL signal quality. Alternatively, the UE may not measure DL reception quality while the waiting timer WT_1 is running. In this case, the UE may measure DL reception quality once expiring of the waiting timer WT_1.

At 520, the UE checks whether the waiting timer WT_1 is expired. If the waiting timer WT_1 is not yet expired, the UE may wait a certain time period and then check again. If the waiting timer WT_1 is expired at 520, the UE will proceed to 522 to determine whether the current received DL signal quality is below or equal to the second threshold TH_2. If the current received DL signal quality is below or equal to the second threshold TH_2, the UE will proceed to 524 to start a marginal timer T_2. Otherwise, the UE returns to the initial stage to compare DL reception quality with the first threshold TH_1.

At 516, if the current received DL signal quality is below or equal to the second threshold TH_2, the UE will proceed directly to 524 to start the second marginal timer T_2 without starting the waiting timer WT_1. In this example method, the UE sets the marginal timer T_2 to verify whether the DL reception quality continues to be below or equal to TH_2 for sending the D2D information message to the network for initiating D2D communication. The value of the marginal timer T_2 may be defined as elapsed time in seconds, subframes, radio frames, or other time units. The value of the marginal timer T_2 may be allocated by the network using DL RRC message, MAC control element (CE), or SIB message. In some implementations, the marginal timer $T\_2$ may be defined as a pre-determined parameter or defined by operator's requirement.

While the marginal timer $T\_2$ is running, the UE may continually measure DL reception quality to make a decision after expiring of timer $T\_2$. In this case, the UE may use accumulated DL reception quality for the determination of received DL signal quality. Alternatively, the UE may not measure DL reception quality while the timer $T\_2$ is running. In this case, the UE may measure DL reception quality once expiring of timer $T\_2$.

At 526, the UE checks whether the marginal timer $T\_2$ is expired. If the marginal timer $T\_2$ is not yet expired, the UE may wait a certain time period and then check again. If the marginal timer $T\_2$ is expired at 526, the UE will proceed to 528 to determine whether the current received DL signal quality is still below or equal to the first threshold $TH\_1$. If at this time, the current received DL signal quality becomes better and is above the first threshold $TH\_1$, the UE will refrain from sending any message to the network to initiate the D2D communication. Instead, the UE will stop the marginal timer $T\_2$, reset it to zero, and return to step 506 of this example method. In other words, the triggering condition for initiating D2D communication is cleared. On the other hand, if the current received DL signal quality is still below or equal to the first threshold $TH\_1$, the UE then proceeds to determine whether the current received DL signal quality is still below or equal to the second threshold $TH\_2$ at 530. If the current received DL signal quality is above the second threshold $TH\_2$, the UE will refrain from sending any message to the network to initiate the D2D communication. Instead, the UE will stop the marginal timer $T\_2$, reset it to zero, and return to step 518 of this example method to start the waiting timer $WT\_1$. On the other hand, if the current received DL signal quality is still below or equal to the second threshold $TH\_2$, the UE then proceeds to send a D2D information message to the base station at 532. The D2D information message may include UE's D2D related information such that the network may transfer this information to neighboring UEs to form D2D communication links with the UE. The D2D information message may include UE's location, residual power, supportable QoS level, or other information necessary for D2D communication. After receiving the message from the UE, the base station may updates the neighboring UEs in its cell and neighbor networks with D2D information received from that UE. In some implementations, the base station may share this information via X2 interface with the neighboring base stations.

In some implementations, marginal counters $C\_1$ and $C\_2$ may be used in place of the marginal timer $T\_1$ and $T\_2$. The values of marginal counters $C\_1$ and $C\_2$ may be defined in number of subframes/frames, Transmission Time Interval (TTI), or other countable unit. The marginal counter $C\_1$ and $C\_2$ can be applied in connection with the thresholds $TH\_1$ and $TH\_2$ with the same behavior applied to the marginal timer $T\_1$ and $T\_2$. The value of the marginal counters $C\_1$ and $C\_2$ may be allocated by the network using DL RRC message, MAC control element (CE), or SIB message. In some implementations, the marginal counters $C\_1$ and $C\_2$ may be defined as pre-determined parameters or defined by operator's requirement.

In some implementations, marginal counters $C\_1$ and $C\_2$ may be used in combination with the marginal timer $T\_1$ and $T\_2$. For example, the marginal timer $T\_1$ and marginal counter $C\_1$ may be started when the DL reception quality is lower than the first threshold $TH\_1$. The UE proceeds to the second stage of the D2D initiation process (e.g. $TH\_2$ related) after expiring of either of the marginal timer $T\_1$ or the marginal counter $C\_1$. The marginal timer $T\_2$ and marginal counter $C\_2$ may be started when the DL reception quality is below or equal to the second threshold $TH\_2$. The UE sends D2D information message to the network after expiring of either of the marginal timer $T\_2$ or the marginal counter $C\_2$.

In some implementations, waiting counter $WC\_1$ may be used in place of the waiting timer $WT\_1$. The values of waiting counter $WC\_1$ may be defined in number of subframes/frames, TTI, or other countable unit. The waiting counter $WC\_1$ can be applied in connection with the second threshold $TH\_2$ with the same behavior applied to the waiting timer $WT\_1$. The value of the waiting counter $WC\_1$ may be allocated by the network using DL RRC message, MAC control element (CE), or SIB message. In some implementations, the waiting counter $WC\_1$ may be defined as pre-determined parameters or defined by operator's requirement.

In some implementations, waiting counter $WC\_1$ may be used in combination with the waiting timer $WT\_1$. For example, the waiting counter $WC\_1$ and waiting timer $WT\_1$ may be started when the DL reception quality is above the second threshold $TH\_2$ at 518. The UE proceeds to start the marginal timer $T\_2$ after expiring of either of the waiting counter $WC\_1$ or waiting timer $WT\_1$. The UE may return to the initial stage of initiating the D2D communication when the DL reception quality is above the second threshold $TH\_2$ after expiring of either of the waiting timer $WT\_1$ or the waiting counter $WC\_1$.

It should be understood the number of marginal timers, marginal counters, waiting timer, waiting counter may vary from the illustrated method without departing from the scope of the present disclosure. For example, in some implementations, the waiting timer or waiting counter may be omitted while only the marginal timers are applied.

In some implementations, a Radio Link Failure (RLF) situation and decision may be used in connection with the thresholds and procedures described above. For example, the illustrated method 500 may be initiated during RLF situation. In the RLF situation, the UE may send a D2D information request message to the network based on the received DL signal quality and the first threshold $TH\_1$. Before the final decision of RLF, the UE may send a D2D information message to the network based on a level of the received DL signal quality and the second threshold $TH\_2$. After then, the UE may transit to D2D communication domain with declaration of the RLF situation.

In some implementations, an SIB message may be sent from the base station to the UE to indicate the configurations of thresholds, marginal timers, and the waiting timer. For example, SystemInformationBlockType3 information element (IE) may be used to indicate the configurations of these D2D related parameters. Note that other system information block may also be used to indicate the configurations of these D2D related parameters. In one embodiment, the SystemInformationBlockType3 information element from 3GPP Technical Specification (TS) 36.331, which is incorporated herein by reference, may be modified in accordance with Table 1 below to include the D2D related information. The field descriptions of the SystemInformationBlockType3 information element are provided in Table 2.

TABLE 1

SystemInformationBlockType3 Information Element

```
-- ASN1START
SystemInformationBlockType3 ::=   SEQUENCE {
    cellReselectionInfoCommon       SEQUENCE {
        q-Hyst                              ENUMERATED {
                                                dB0, dB1, dB2, dB3, dB4, dB5, dB6, dB8, dB10,
                                                dB12, dB14, dB16, dB18, dB20, dB22, dB24},
        speedStateReselectionPars       SEQUENCE {
            mobilityStateParameters         MobilityStateParameters,
            q-HystSF                        SEQUENCE {
                sf-Medium                       ENUMERATED {
                                                    dB-6, dB-4, dB-2, dB0},
                sf-High                         ENUMERATED {
                                                    dB-6, dB-4, dB-2, dB0}
            }
        }                                                                   OPTIONAL   -- Need OP
    },
    cellReselectionServingFreqInfo  SEQUENCE {
        s-NonIntraSearch                ReselectionThreshold            OPTIONAL,  -- Need OP
        threshServingLow                ReselectionThreshold,
        cellReselectionPriority         CellReselectionPriority
    },
    intraFreqCellReseleotionInfo    SEQUENCE {
        q-RxLevMin                      Q-RxLevMin,
        p-Max                           P-Max                           OPTIONAL,  -- Need OP
        s-IntraSearch                   ReselectionThreshold            OPTIONAL,  -- Need OP
        allowedMeasBandwidth            AllowedMeasBandwidth            OPTIONAL,  -- Need OP
        presenceAntennaPort1            PresenceAntennaPort1,
        neighCellConfig                 NeighCellConfig,
        t-ReselectionEUTRA              T-Reselection,
        t-ReselectionEUTRA-SF           SpeedStateScaleFactors          OPTIONAL   -- Need OP
    },
    ...,
    lateR8NonCriticalExtension          OCTET STRING   OPTIONAL,-- Need OP
    [[ s-IntraSearch-v920               SEQUENCE {
           s-IntraSearchP-r9                ReselectionThreshold,
           s-IntraSearchQ-r9                ReselectionThresholdQ-r9
       }                                                                OPTIONAL,  -- Need OP
       s-NonIntraSearch-v920            SEQUENCE {
           s-NonIntraSearchP-r9             ReselectionThreshold,
           s-NonIntraSearchQ-r9             ReselectionThresholdQ-r9
       }                                                                OPTIONAL,  -- Need OP
       q-QualMin-r9                     Q-QualMin-r9                   OPTIONAL,  -- Need OP
       threshServingLowQ-r9             ReselectionThresholdQ-r9       OPTIONAL   -- Need OP
    ]]
    d2DDiscoverySelectionInfo           SEQUENCE {
        d-threshold1                    Threshold                      OPTIONAL,  -- Need OP
        d-threshold2                    Threshold2                     OPTIONAL,  -- Need OP
        d-marginalTimer1                MarginalTimer1                 OPTIONAL,  -- Need OP
        d-marginalTimer2                MarginalTimer2                 OPTIONAL,  -- Need OP
        d-waitingTimer1                 WaitingTimer1                  OPTIONAL,  -- Need OP
    }
}
-- ASN1STOP
```

TABLE 2

SystemInformationBlockType3 Field Descriptions cellReselectionInfoCommon
Cell re-selection information common for cells.
q-Hyst
Parameter $Q_{hyst}$ in 36.304, Value in dB. Value dB1 corresponds to 1 dB, dB2 corresponds to 2 dB and so on.
speedStateReselectionPars
Speed dependent reselection parameters, see TS 36.304 [4]. If this field is absent, i.e, mobilityStateParameters is also not present, UE behaviour is specified in TS 36.304 [4].
q-HystSF
Parameter "Speed dependent ScalingFactor for $Q_{hyst}$" in TS 36.304 [4]. The sf-Medium and sf-High concern the additional hysteresis to be applied, in Medium and High Mobility state respectively, to $Q_{hyst}$ as defined in TS 36.304 [4]. In dB. Value dB-6 corresponds to −6 dB, dB-4 corresponds to −4 dB and so on.
t-ReselectionEUTRA
Parameter "Treselection$_{EUTRA}$" in TS 36.304 [4].
t-ReselectionEUTRA-SF
Parameter "Speed dependent ScalingFactor for Treselection$_{EUTRA}$" in TS 36.304 [4]. If the field is not present, the UE behaviour is specified in TS 36.304 [4].
q-RxLevMin TABLE 2-continued SystemInformationBlockType3 Field Descriptions Parameter "$Q_{rxlevmin}$" in TS 36.304 [4], applicable for intra-frequency neighbour cells.
s-IntraSearch
Parameter "$S_{IntraSearchP}$" in TS 36.304 [4]. If the field s-IntraSearchP is present, the UE applies the value of s-IntraSearchP instead. Otherwise if neither s-IntraSearch nor s-IntraSearchP is present, the UE applies the (default) value of infinity for $S_{IntraSearchP}$.
cellReselectionServingFreqInfo
Information common for Cell re-selection to inter-frequency and inter-RAT cells.
s-NonIntraSearch
Parameter "$S_{nonIntraSearchP}$" in TS 36.304 [4]. If the field s-NonIntraSearchP is present, the UE applies the value of s-NonIntraSearchP instead. Otherwise if neither s-NonIntraSearch nor s-NonIntraSearchP is present, the UE applies the (default) value of infinity for $S_{nonIntraSearchP}$.
threshServingLow
Parameter "$Thresh_{Serving, LowP}$" in TS 36.304 [4].
intraFreqcellReselectionInfo
Cell re-selection information common for intra-frequency cells.
p-Max
Value applicable for the intra-frequency neighbouring E-UTRA cells. If absent the UE applies the maximum power according to the UE capability.
allowedMeasBandwidth
If absent, the value corresponding to the downlink bandwidth indicated by the dl-Bandwidth included in MasterInformationBlock applies.
s-IntraSearchP
Parameter "$S_{IntraSearchP}$" in TS 36.304 [4]. See descriptions under s-IntraSearch.
s-IntraSearchQ
Parameter "$S_{IntraSearchQ}$" in TS 36.304 [4]. If the field is not present, the UE applies the (default) value of 0 dB for $S_{IntraSearchQ}$
s-NonIntraSearchP
Parameter "$S_{nonIntraSearchP}$" in TS 36.304 [4]. See descriptions under s-NonIntraSearch.
s-NonIntraSearchQ
Parameter "$S_{nonIntraSearchQ}$" in TS 36.304 [4]. If the field is not present, the UE applies the (default) value of 0 dB for $S_{nonIntraSearch}$
q-QualMin
Parameter "$Q_{qualmin}$" in TS 36.304 [4], applicable for intra-frequency neighrbour cells. If the field is not present, the UE applies the (default) value of negative infinity for $Q_{qualmin}$.
threshServingLowQ
Parameter "$Thresh_{Serving, LowQ}$" in TS 36.304 [4].
d-Threshold1
This specifies the first threshold used in D2D discovery and communication in units of dB
d-Threshold2
This specifies the second threshold used in D2D discovery and communication in units of dB
d-marginalTimer1
This specifies the first marginal timer used in D2D discovery and communication in units of ms
d-marginaltimer2
This specifies the second marginal timer used in D2D discovery and communication in units of ms
d-waitingTimer1
This specifies the waiting timer used in D2D discovery and communication in units of ms In some implementations, an RRCConnectionReconfiguration message may be sent from the base station to the UE to indicate the configurations of thresholds, marginal timers, and the waiting timer. The RRCConnectionReconfiguration message is the command to modify an RRC connection. For example, RRCConnectionReconfiguration-r12-IEs information element (IE) may be used to indicate the configurations of these D2D related parameters. In one embodiment, the RRCConnectionReconfiguration message from 3GPP Technical Specification (TS) 36.331 may be modified in accordance with Table 3 below to include the D2D related information. The field descriptions of the RRCConnectionReconfiguration message are provided in Table 4.

```
-- ASN1START
RRCConnectionReconfiguration ::=    SEQUENCE {
    rrc-TransactionIdentifier          RRC-TransactionIdentifier,
    criticalExtensions                 CHOICE {
        c1                                 CHOICE{
            rrcConnectionReconfiguration-r8    RRCConnectionReconfiguration-r8-IEs,
            rrcConnectionReconfiguration-r12   RRCConnectionReconfiguration-r12-IEs,
            spare7 NULL,
            spare6 NULL, spare5 NULL, spare4 NULL,
            spare3 NULL, spare2 NULL, spare1 NULL
        },
        criticalExtensionsFuture           SEQUENCE { }
    }
}
RRCConnectionReconfiguration-r8-IEs ::= SEQUENCE {
    measConfig                         MeasConfig                         OPTIONAL,-- Need ON
    mobilityControlInfo                MobilityControlInfo                OPTIONAL,-- Cond HO
    dedicatedInfoNASList               SEQUENCE (SIZE(1..maxDRB)) OF
```

```
                                    DedicatedInfoNAS                    OPTIONAL,-- Cond nonHO
        radioResourceConfigDedicated  RadioResourceConfigDedicated       OPTIONAL, -- Cond HO-toEUTRA
        securityConfigHO              SecurityConfigHO                   OPTIONAL,-- Cond HO
        nonCriticalExtension          RRCConnectionReconfiguration-v890-IEs  OPTIONAL
}
RRCConnectionReconfiguration-r12-IEs ::= SEQUENCE {
        d-threshold1                  Threshold                          OPTIONAL, -- Need OP
        d-threshold2                  Threshold2                         OPTIONAL, -- Need OP
        d-marginalTimer1              MarginalTimer1                     OPTIONAL, -- Need OP
        d-marginalTimer2              MarginalTimer2                     OPTIONAL, -- Need OP
        d-waitingTimer1               WaitingTimer1                      OPTIONAL, -- Need OP
}
RRCConnectionReconfiguration-v890-IEs ::= SEQUENCE {
        lateRSNonCriticalExtension    OCTET STRING                       OPTIONAL,-- Need OP
        nonCriticalExtension          RRCConnectionReconfiguration-v920-IEs  OPTIONAL
}
RRCConnectionReconfiguration-v920-IEs ::= SEQUENCE {
        otherConfig-r9                OtherConfig-r9                     OPTIONAL,-- Need ON
        fullConfig-r9                 ENUMERATED {true}                  OPTIONAL, -- Cond HO-Reestab
        nonCriticalExtension          SEQUENCE { }                       OPTIONAL -- Need OP
}
SecurityConfigHO ::=         SEQUENCE {
        handoverType                 CHOICE {
              intraLTE                        SEQUENCE {
                    securityAlgorithmConfig         SecurityAlgorithmConfig    OPTIONAL,-- Cond
fullConfig
                    keyChangeIndicator              BOOLEAN,
                    nextHopChainingCount            NextHopChainingCount
              },
              interRAT                        SEQUENCE {
                    securityAlgorithmConfig         SecurityAlgorithmConfig,
                    nas-SecurityParamToEUTRA        OCTET STRING (SIZE(6))
              }
        },
        ...
}
-- ASN1STOP
```

TABLE 4

RRCConnectionReconfiguration Field Descriptions dedicatedInfoNASList
This field is used to transfer UE specific NAS layer information between the network and the UE. The RRC layer is transparent for each PDU in the list.
nas-securityParamToEUTRA
This field is used to transfer UE specific NAS layer information between the network and the UE. The RRC layer is transparent for this field, although it affects activation of AS- security after inter-RAT handover to E-UTRA. The content is defined in TS 24.301.
keyChangeIndicator
'true' is used only in an intra-cell handover when a $K_{eNB}$ key is derived from a native $K_{ASME}$ key taken into use through the successful NAS SMC, as described in TS 33.401 [32] for $K_{eNB}$ re-keying, 'false' is used in an intra-LTE handover when the new $K_{eNB}$ key is obtained from the current $K_{eNB}$ key or from the NH as described in TS 33.401 [32].
nextHopChainingCount
Parameter NCC: See TS 33.401
fullConfig
Indicates the full configuration option is applicable for the RRC Connection Reconfiguration message.
d-Threshold1
This specifies the first threshold used in D2D discovery and communication in units of dB
d-Threshold2
This specifies the second threshold used in D2D discovery and communication in units of dB
d-marginalTimer1
This specifies the first marginal timer used in D2D discovery and communication in units of ms
d-marginaltimer2
This specifies the second marginal timer used in D2D discovery and communication in units of ms
d-waitingTimer1
This specifies the waiting timer used in D2D discovery and communication in units of ms The above described method uses DL received quality for determining whether to initiate D2D communications. In some implementations, uplink received quality may also be used to determine whether to initiate D2D communications as a UE is moving away from the network coverage.

Figure 6:
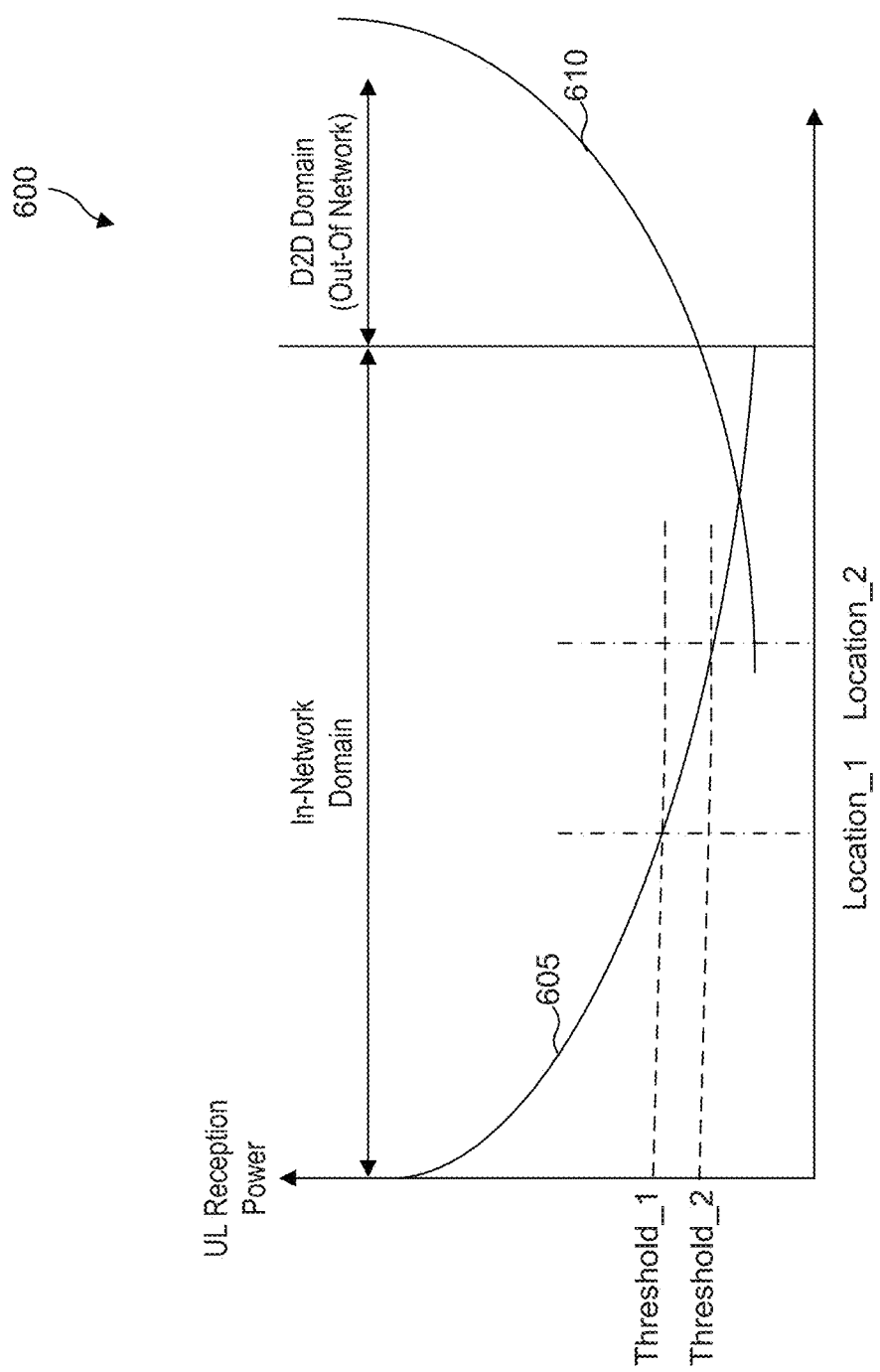
FIG. 6 illustrates another example graph used to explain another scenario for initiating device-to-device communication, in accordance with an embodiment of the present disclosure.

FIG. 6 illustrates another graph 600 used to explain a second, sometimes alternative scenario for initiating device-to-device communication, in accordance with an embodiment of the present disclosure. The horizontal axis of graph 600 represents geographical location of the UE, and the vertical axis of graph 600 represents the uplink signal reception power at the base station. As the UE moves out of in-network domain and moves into the D2D domain, the uplink (UL) signal reception quality at its serving base station 605 decreases, whereas the UL signal reception quality at the neighboring UEs 610 increases. The UL signal reception quality could include UL sounding reference signal reception quality, or random access channel reception quality, uplink shared channel reception quality, etc. A two-stage process, that is, a first stage of information request and a second stage of actual information transfer, may be used to initiate the D2D communication. For example, when the UE moves to Location_1 and UL signal reception quality at the serving base station 605 falls below or equal to a first threshold, Threshold_1, the base station may initiate a first stage of D2D communication initiation with the UE. During this first stage, the base station may send a D2D information request message or a D2D request message to the UE. When the UE receives a D2D information request or D2D request message from the network, the UE may send D2D related information of neighboring UEs to the base station, or accept or reject the D2D communication request. As the UE continues to move away from the network to Location_2 and the UL signal reception quality at its serving base station 605 falls below or equal to a second threshold, Threshold_2, the base station may initiate a second stage of D2D communication initiation with the UE. During this second stage, the base station may send a D2D information message to the UE. When the UE receives the D2D information message from the base station, the UE may update its D2D related information accordingly. Eventually as the UE moves out of the network and enters into the D2D domain, the UE is disconnected with the network but the UE may establish D2D communication with other UEs using the provided information from the network.

Figure 7:
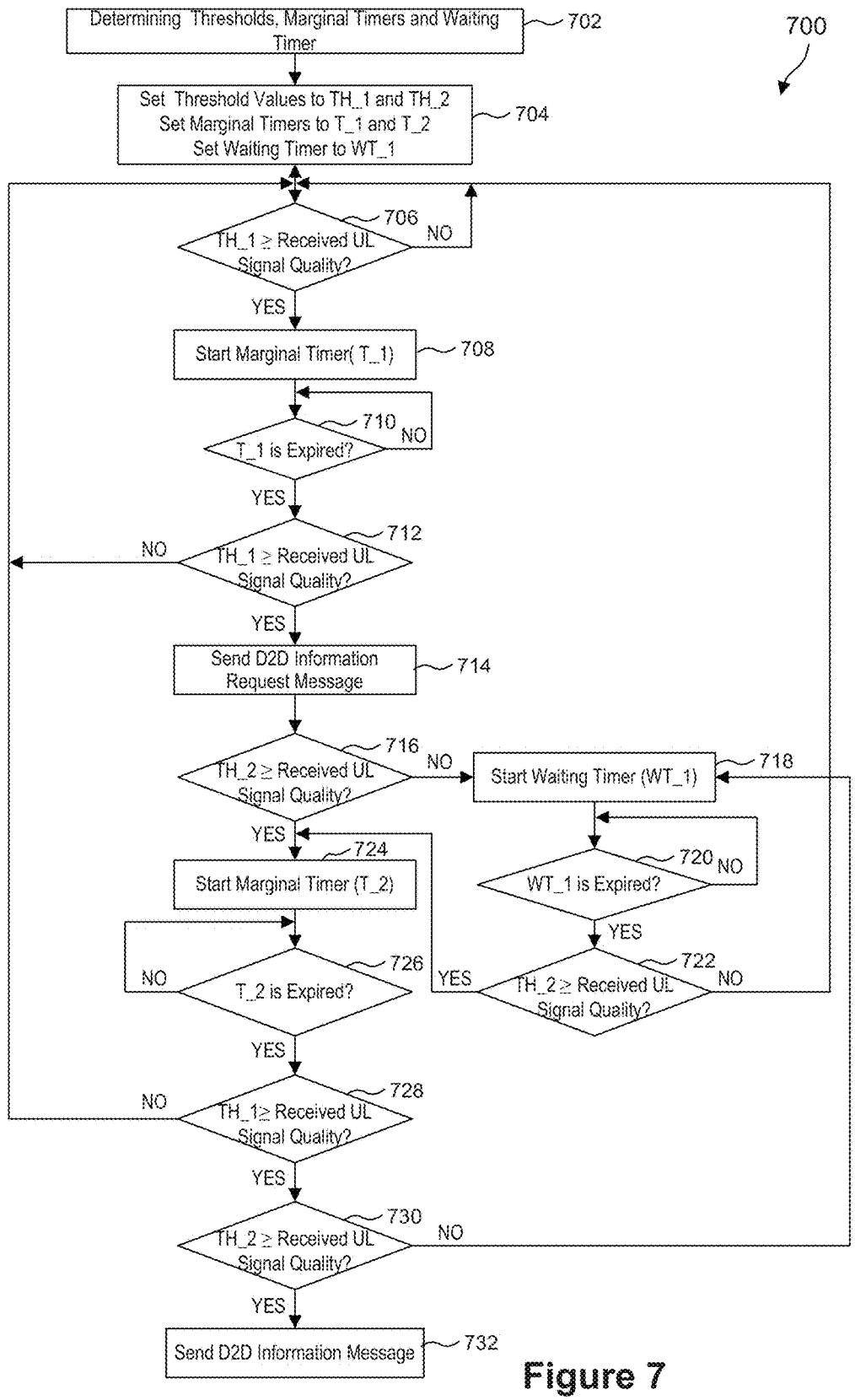
FIG. 7 illustrates a block diagram of another example method for initiating device-to-device communication in a wireless network, in accordance with an embodiment of the present disclosure.

FIG. 7 illustrates a block diagram 700 of another example method for initiating device-to-device communication in a wireless network, in accordance with an embodiment of the present disclosure. In this example method, the base station measures its received UL signal quality from the UE, and initiates the D2D communication based on the received UL signal quality. The received UL signal quality may be based on base station's measurement of uplink Sounding Reference Signal (SRS), uplink Signal to Interference Noise Ratio (SINR), etc.

At 702, the base station determines values of the thresholds, marginal timers, and waiting timer. The thresholds and timers are used in the two-stage process to determine whether to send a request to the UE for initiation of D2D communication. In some implementations, the network and the UE may negotiate the values of the thresholds, marginal timers, and waiting timer. For example, the UE may request the values of the thresholds using UL RRC message or MAC CE. The network may adjust the values of the threshold based on the received message from the UE, and then the network may send them back to the UE using DL RRC message, MAC CE or SIB message. When the UE receives adjusted threshold values from the network, the UE may refer to them when suggesting the threshold values in future. In some implementations, the network may implement the thresholds as pre-defined parameters, and in this case, the network may not need to indicate the threshold values to the UE. In one embodiment, the network may update the threshold values if the previously provided values are not suitable.

At 704, the base station sets the two threshold values to be TH_1 and TH_2 respectively. The base station also sets the values of the two marginal timers to be T_1 and T_2, and sets the value of the waiting timer to be WT_1. At 706, the base station determines whether the received UL signal quality is below or equal to the first threshold TH_1. The first threshold TH_1 may be defined in dB unit. The first threshold TH_1 may also be defined by the number of subframes failed to be decoded at the base station.

If the received UL signal quality is above the first threshold TH_1, the base station will not initiate the D2D communication. On the other hand, if the received UL signal quality is below or equal to the first threshold TH_1, the base station starts the marginal timer T_1 at 708. In this example method, the base station sets the marginal timer to verify whether the UL reception quality continues to be below or equal to TH_1 for sending the D2D information request message to the UE. The value of the marginal timer T_1 may be defined as elapsed time in seconds, subframes, radio frames, or other time units. The value of the marginal timer T_1 may be negotiated between the network and the UE. For example, the UE may request the value of the marginal timer T_1 using UL RRC message or MAC CE. The network may adjust the value of the marginal timer T_1 based on the received message from the UE, and then the network may send it back to the UE using DL RRC message, MAC CE or SIB message. When the UE receives adjusted value of the marginal timer T_1 from the network, the UE may refer to it when suggesting the value of the marginal timer T_1 in future. In some implementations, the network may implement the marginal timer T_1 as pre-defined parameters, and in this case, the network may not need to indicate the value of the marginal timer T_1 to the UE.

While the marginal timer T_1 is running, the base station may continually measure UL reception quality to make a decision after expiring of timer T_1. In this case, the base station may use accumulated UL reception quality for the determination of received UL signal quality. Alternatively, the base station may not measure UL reception quality while the timer T_1 is running. In this case, the base station may measure UL reception quality once expiring of timer T_1.

At 710, the base station checks whether the marginal timer T_1 is expired. If the marginal timer T_1 is not yet expired, the base station may wait a certain time period and then check again. If the marginal timer T_1 is expired at 710, the base station will proceed to 712 to determine whether the current received UL signal quality is still below or equal to the first threshold TH_1. If at this time, the current received UL signal quality becomes better and is above the first threshold, the base station will refrain from sending any message to the UE to initiate the D2D communication. Instead, the base station will stop the marginal timer T_1, reset it to zero, and return to step 706 of this example method. In other words, the triggering condition for initiating D2D communication is cleared. On the other hand, if the current received UL signal quality is still below or equal to the first threshold TH_1, the base station then proceeds to send a D2D information request message or a D2D request message to the UE at 714. The D2D information message requests the UE to send the information of its neighboring UEs to the network. After receiving the D2D information message from the base station, the UE may then send D2D related information of neighboring UEs which have potential to form D2D communication links to the base station. The D2D request message requests the UE to either accept or reject the D2D communication request when the UE is currently connected with other UEs for D2D communication. After receiving the D2D request message, the UE may either accept or reject the D2D request from the network.

At 716, the base station determines whether the current received UL signal quality from the UE is below or equal to a second threshold, TH_2. The second threshold TH_2 may be defined in dB unit. The second threshold TH_2 may also be defined by the number of subframes failed to be decoded at the UE.

If the current received UL signal quality is above the second threshold TH_2, the base station starts a waiting timer WT_1 at 718. The value of the waiting timer WT_1 may be defined as elapsed time in seconds, subframes, radio frames, or other time units. The value of the waiting timer WT_1 may be negotiated between the network and the UE. For example, the UE may request the value of the waiting timer WT_1 using UL RRC message or MAC CE. The network may adjust the value of the waiting timer WT_1 based on the received message from the UE, and then the network may send it back to the UE using DL RRC message, MAC CE or SIB message. When the UE receives adjusted value of the waiting timer WT_1 from the network, the UE may refer to it when suggesting the value of the waiting timer WT_1 in future. In some implementations, the network may implement the waiting timer WT_1 as pre-defined parameters, and in this case, the network may not need to indicate the value of the waiting timer WT_1 to the UE.

While the waiting timer WT_1 is running, the base station may continually measure UL reception quality to make a decision after expiring of the waiting timer WT_1. In this case, the base station may use accumulated UL reception quality for the determination of received UL signal quality. Alternatively, the base station may not measure UL reception quality while the waiting timer WT_1 is running. In this case, the base station may measure UL reception quality once expiring of the waiting timer WT_1.

At 720, the base station checks whether the waiting timer WT_1 is expired. If the waiting timer WT_1 is not yet expired, the base station may wait a certain time period and then check again. If the waiting timer WT_1 is expired at 720, the base station will proceed to 722 to determine whether the current received UL signal quality is below or equal to the second threshold TH_2. If the current received UL signal quality is below or equal to the second threshold TH_2, the base station will proceed to 724 to start a second marginal timer. Otherwise, the base station returns to the initial stage to compare UL reception quality with the first threshold TH_1.

At 716, if the current received UL signal quality is below or equal to the second threshold TH_2, the base station will proceed directly to 724 to start the marginal timer T_2 without starting the waiting timer WT_1. In this example method, the base station sets the marginal timer T_2 to verify whether the UL reception quality continues to be valid for sending the D2D information message to the UE for initiating D2D communication. The value of the marginal timer T_2 may be defined as elapsed time in seconds, subframes, radio frames, or other time units. The value of the marginal timer T_2 may be negotiated between the network and the UE. For example, the UE may request the value of the marginal timer T_2 using UL RRC message or MAC CE. The network may adjust the value of the marginal timer T_2 based on the received message from the UE, and then the network may send it back to the UE using DL RRC message, MAC CE or SIB message. When the UE receives adjusted value of the marginal timer T_2 from the network, the UE may refer to it when suggesting the value of the marginal timer T_2 in future. In some implementations, the network may implement the marginal timer T_2 as pre-defined parameters, and in this case, the network may not need to indicate the value of the marginal timer T_2 to the UE.

While the marginal timer T_2 is running, the base station may continually measure UL reception quality to make a decision after expiring of timer T_2. In this case, the base station may use accumulated UL reception quality for the determination of received UL signal quality. Alternatively, the base station may not measure UL reception quality while the timer T_2 is running. In this case, the base station may measure UL reception quality once expiring of timer T_2.

At 726, the base station checks whether the marginal timer T_2 is expired. If the marginal timer T_2 is not yet expired, the base station may wait a certain time period and then check again. If the marginal timer T_2 is expired at 726, the base station will proceed to 728 to determine whether the current received UL signal quality is still below or equal to the first threshold TH_1. If at this time, the current received UL signal quality becomes better and is above the first threshold, the base station will refrain from sending any message to the UE to initiate the D2D communication. Instead, the base station will stop the marginal timer T_2, reset it to zero, and return to step 706 of this example method. In other words, the triggering condition for initiating D2D communication is cleared. On the other hand, if the current received UL signal quality is still below or equal to the first threshold TH_1, the base station then proceeds to determine whether the current received UL signal quality is still below or equal to the second threshold TH_2 at 730. If the current received UL signal quality is above the second threshold TH_2, the base station will refrain from sending any message to the UE to initiate the D2D communication. Instead, the base station will stop the marginal timer T_2, reset it to zero, and return to step 718 of this example method to start the waiting timer WT_1. On the other hand, if the current received UL signal quality is still below or equal to the second threshold TH_2, the base station then proceeds to send a D2D information message to the UE at 732. The D2D information message may include neighboring UE's D2D related information such as neighboring UE's location, residual power, supportable QoS level, available D2D service information, or other information necessary for D2D communication. After receiving the message from the base station, the UE may update the neighboring UEs in its cell and neighbor networks with D2D information received from the base station.

In some implementations, marginal counters C_1 and C_2 may be used in place of the marginal timer T_1 and T_2. The values of marginal counters C_1 and C_2 may be defined in number of subframes/frames, Transmission Time Interval (TTI), or other countable unit. The marginal counters C_1 and C_2 can be applied in connection with the thresholds TH_1 and TH_2 with the same behavior applied to the marginal timer T_1 and T_2. The values of the marginal counters C_1 and C_2 may be negotiated between the network and the UE. For example, the UE may request the values of the marginal counters C_1 and C_2 using UL RRC message or MAC CE. The network may adjust the values marginal counters C_1 and C_2 based on the received message from the UE, and then the network may send it back to the UE using DL RRC message, MAC CE or SIB message. When the UE receives adjusted marginal counters C_1 and C_2 from the network, the UE may refer to it when suggesting the values of marginal counters C_1 and C_2 in future. In some implementations, the network may implement the marginal counters C_1 and C_2 as pre-defined parameters, and in this case, the network may not need to indicate the values of the marginal counters C_1 and C_2 to the UE.

In some implementations, marginal counters C_1 and C_2 may be used in combination with the marginal timer T_1 and T_2. For example, the marginal timer T_1 and marginal counter C_1 may be started when the UL reception quality is lower than the first threshold TH_1. The base station proceeds to the second stage of the D2D initiation process (e.g. TH_2 related) after expiring of either of the marginal timer T_1 or the marginal counter C_1. The marginal timer T_2 and marginal counter C_2 may be started when the UL reception quality is below or equal to the second threshold TH_2. The base station sends D2D information message to the UE after expiring of either of the marginal timer T_2 or the marginal counter C_2.

In some implementations, waiting counter WC_1 may be used in place of the waiting timer WT_1. The values of waiting counter WC_1 may be defined in number of sub-frames/frames, TTI, or other countable unit. The waiting counter WC_1 can be applied in connection with the second threshold TH_2 with the same behavior applied to the waiting timer WT_1. The value of the waiting counter WC_1 may be negotiated between the network and the UE. For example, the UE may request the value of the waiting counter WC_1 using UL RRC message or MAC CE. The network may adjust the value of the waiting counter WC_1 based on the received message from the UE, and then the network may send it back to the UE using DL RRC message, MAC CE or SIB message. When the UE receives adjusted value of the waiting counter WC_1 from the network, the UE may refer to it when suggesting the value of the waiting counter WC_1 in future. In some implementations, the network may implement the waiting counter WC_1 as pre-defined parameters, and in this case, the network may not need to indicate the value of the waiting counter WC_1 to the UE.

In some implementations, waiting counter WC_1 may be used in combination with the waiting timer WT_1. For example, the waiting counter WC_1 and waiting timer WT_1 may be started when the UL reception quality is above the second threshold TH_2 at 718. The base station proceeds to start the marginal timer T_2 after expiring of either of the waiting counter WC_1 or waiting timer WT_1. The base station may return to the initial stage of initiating the D2D communication when the UL reception quality is above the second threshold TH_2 after expiring of either of the waiting timer WT_1 or the waiting counter WC_1.

It should be understood the number of marginal timers, marginal counters, waiting timer, waiting counter may vary from the illustrated method without departing from the scope of the present disclosure. For example, in some implementations, the waiting timer or waiting counter may be omitted while only the marginal timers are applied.

The systems and methods described above may be implemented by any hardware, software or a combination of hardware and software having the above described functions. The software code, either in its entirety or a part thereof, may be stored in a computer readable memory.

The example methods of FIGS. 5 and 7 may be implemented using program or coded instructions (e.g., computer-readable instructions) stored on a tangible computer-readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of 500 and 700 may be implemented using coded instructions (e.g., computer-readable instructions) stored on a non-transitory computer-readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. Also, in the context of the current invention disclosure, as used herein, the terms "computer readable" and "machine readable" are considered technically equivalent unless indicated otherwise.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of a user equipment (UE), comprising:
   sending to a base station a first message requesting information of device-to-device communication when a quality associated with a received signal from the base station is below or equal to a first threshold; and
   sending to the base station a second message when a quality associated with another received signal from the base station is below or equal to a second threshold, wherein the second message includes device-to-device information of the UE and the second threshold is lower than the first threshold.

2. The method of claim 1, further comprising determining whether the quality associated with the received signal from the base station is below or equal to the first threshold.

3. The method of claim 2, further comprising starting a timer after determining that the quality associated with the received signal from the base station is below or equal to the first threshold.

4. The method of claim 3, further comprising determining whether the quality associated with the other received signal from the base station is below or equal to the second threshold after the timer expires.

5. The method of claim 1, further comprising, prior to sending the second message, refraining from sending to the base station the second message when the quality associated with the other received signal from the base station is above the second threshold.

6. The method of claim 1, further comprising determining whether the quality associated with the other received signal from the base station is below or equal to the second threshold.

7. The method of claim 6, further comprising starting a timer after determining the quality associated with the other received signal from the base station is below or equal to the second threshold.

8. The method of claim 7, further comprising determining whether a quality associated with a third received signal from the base station is below or equal to the second threshold after the timer expires.

9. The method of claim 6, further comprising starting a timer after determining that the quality associated with the other received signal from the base station is above the second threshold.

10. The method of claim 9, further comprising determining whether a quality associated with a third received signal from the base station is below or equal to the second threshold after the timer expires.

11. The method of claim 1, wherein indications corresponding to the first threshold and the second threshold are received in a System Information Block (SIB) message, a Radio Resource Control (RRC) message, or a Medium Access Control (MAC) Control Element.

12. A method of a base station, comprising:
sending to a user equipment (UE) a first message requesting information of device-to-device communication when a quality associated with a received signal from the UE is below or equal to a first threshold; and
sending a second message to the UE enabling the device-to-device communication when a quality associated with another received signal from the UE is below or equal to a second threshold, wherein the second threshold is lower than the first threshold.

13. The method of claim 12, further comprising determining whether the quality associated with the received signal from the UE is below or equal to the first threshold.

14. The method of claim 13, further comprising starting a timer after determining that the quality associated with the received signal from the UE is below or equal to the first threshold.

15. The method of claim 14, further comprising determining whether the quality associated with the other received signal from the UE is below or equal to the second threshold after the timer expires.

16. The method of claim 12, further comprising, prior to sending the second message, refraining from sending the second message to the UE enabling the device-to-device communication when the quality associated with the other received signal from the UE is above the second threshold.

17. The method of claim 12, further comprising determining whether the quality associated with the other received signal from the UE is below or equal to the second threshold.

18. The method of claim 17, further comprising starting a timer after determining the quality associated with the other received signal from the UE is below or equal to the second threshold.

19. The method of claim 18, further comprising determining whether a quality associated with a third received signal from the base station is below or equal to the second threshold after the timer expires.

20. The method of claim 17, further comprising starting a timer after determining that the quality associated with the other received signal from the UE is not below or equal to the second threshold.

21. The method of claim 20, further comprising determining whether a quality associated with a third received signal from the UE is below or equal to the second threshold after the timer expires.

22. The method of claim 12, further comprising sending indications corresponding to the first threshold and the second threshold to the UE in a System Information Block (SIB) message, a Radio Resource Control (RRC) message, or a Medium Access Control (MAC) Control Element.

23. A user equipment, comprising:
a memory; and
at least one hardware processor communicatively coupled with the memory and configured to:
send to a base station a first message requesting information of device-to-device communication when a quality associated with a received signal from the base station is below or equal to a first threshold; and
send to the base station a second message when a quality associated with another received signal from the base station is below or equal to a second threshold, wherein the second message includes device-to-device information of the UE and the second threshold is lower than the first threshold.

24. A base station, comprising:
a memory; and
at least one hardware processor communicatively coupled with the memory and configured to:
send to a user equipment (UE) a first message requesting information of device-to-device communication when a quality associated with a received signal from the UE is below or equal to a first threshold; and
send to the UE a second message enabling the device-to-device communication when a quality associated with another received signal from the UE is below or equal to a second threshold, wherein the second threshold is lower than the first threshold.

* * * * *